United States Patent
Alex et al.

(10) Patent No.: US 12,417,699 B2
(45) Date of Patent: Sep. 16, 2025

(54) VENUE ENTRY PAYMENT SYSTEM FOR VEHICLES

(71) Applicant: DIRECT TECHNOLOGY HOLDINGS INC, Roslyn Heights, NY (US)

(72) Inventors: Tony Alex, New York, NY (US); Michael Giannone, Levittown, NY (US); Peter J. Degen, Huntington, NY (US)

(73) Assignee: DIRECT TECHNOLOGY HOLDINGS INC, Roslyn Heights, NY (US)

( * ) Notice: Subject to any disclaimer, the term of this patent is extended or adjusted under 35 U.S.C. 154(b) by 796 days.

(21) Appl. No.: 17/502,713

(22) Filed: Oct. 15, 2021

(65) Prior Publication Data
US 2022/0122452 A1 Apr. 21, 2022

Related U.S. Application Data

(60) Provisional application No. 63/092,725, filed on Oct. 16, 2020.

(51) Int. Cl.
*G06V 20/62* (2022.01)
*G06F 16/51* (2019.01)
(Continued)

(52) U.S. Cl.
CPC .......... *G08G 1/0175* (2013.01); *G06F 16/51* (2019.01); *G06Q 20/18* (2013.01); *G06Q 30/04* (2013.01);
(Continued)

(58) Field of Classification Search
CPC ...... G08G 1/0175; G08G 1/149; G06F 16/51; G06Q 20/18; G06Q 30/04; G06Q 20/145;
(Continued)

(56) References Cited

U.S. PATENT DOCUMENTS

| | | | |
|---|---|---|---|
| 2012/0245966 A1* | 9/2012 | Volz | G05B 19/048 705/5 |
| 2016/0078299 A1* | 3/2016 | Nerayoff | G06Q 30/04 705/13 |

(Continued)

OTHER PUBLICATIONS

Fabros, J. P., et al. "Automated Car Park Management System." IOP Conference Series: Materials Science and Engineering. vol. 79. No. 1. IOP Publishing, 2015. (Year: 2015).*

*Primary Examiner* — Sean M Conner
(74) *Attorney, Agent, or Firm* — Collard & Roe, P.C.

(57) ABSTRACT

There is a system for admitting automobiles to a venue comprising: at least one camera for recognizing an automobile, and a license plate. A server is configured for receiving a picture of the automobile and a picture of the license plate of the automobile. Furthermore, there is at least one database for storing, matching and identifying the picture of the automobile and the license plate. In addition, there is at least one screen for allowing a user to identify their automobile taken from a list of automobiles. There is also a process for tracking an automobile within an area which comprises the steps of identifying a pre-defined area and identifying an automobile for screening into the area. Next the auto and its license plate are photographed. This information is stored in a database and then used to generate invoices and track the location of these automobiles. Customer can access the database, enter the license plate of his vehicle, the database recognizes his vehicle, the customer makes payment for his vehicle, and the app places the customer information onto the PAID category list on the database.

17 Claims, 10 Drawing Sheets

(51) Int. Cl.
   *G06Q 20/18*   (2012.01)
   *G06Q 30/04*   (2012.01)
   *G06V 20/10*   (2022.01)
   *G08G 1/017*   (2006.01)

(52) U.S. Cl.
   CPC ............ *G06V 20/10* (2022.01); *G06V 20/625* (2022.01); *G06V 2201/08* (2022.01)

(58) Field of Classification Search
   CPC .. G06Q 20/3224; G06Q 20/326; G06V 20/10; G06V 20/625; G06V 2201/08; G06V 20/54
   See application file for complete search history.

(56) References Cited

U.S. PATENT DOCUMENTS

| | | | |
|---|---|---|---|
| 2019/0066492 A1* | 2/2019 | Nijhuis | G06V 20/52 |
| 2020/0219390 A1* | 7/2020 | Lyles | G07B 15/02 |
| 2020/0234590 A1* | 7/2020 | Ma | G06Q 10/06398 |
| 2021/0174330 A1* | 6/2021 | Kim | G06Q 20/145 |
| 2021/0375087 A1* | 12/2021 | Fieglein | G08B 13/19602 |

* cited by examiner

VENUE ENTRY PAYMENT SYSTEM FOR VEHICLES

CROSS REFERENCE TO RELATED APPLICATIONS

This application is a non-provisional application that claims priority from U.S. Provisional Application Ser. No. 63/092,725 filed on Oct. 16, 2020, the disclosure of which is hereby incorporated by reference.

BACKGROUND OF THE INVENTION

At least one embodiment of this invention relates to a system for payment of entry fee for motor vehicles into fee areas such as parks, campgrounds and beaches without the requirement for gated entry, payment booths or manual labor at point of entry.

Current entry systems require the use of entry gates and entry booth attendants at all entrances for the collection of entry fees. The variable and sometimes very high entry demand results in long lines of cars waiting to get to the toll booth to gain entry. Additionally, the need to carry out a face-to-face transaction at the gate can pose health risk during epidemics such as covid19 and influenza. Therefore, a more efficient and non-contact entry transaction is desirable.

During peak periods, it is common to have over 100 cars in line waiting to get to the toll booth.

For example, in a news report by Channel 4 NBC NY, on Apr. 20, 2020, a reporter stated that "Around 30,000 people were estimated to have gone to Robert Moses State Park beach on Long Island on Saturday". These waiting lines sometimes extend onto the feeder highways and pose traffic problems as well. At an average processing speed of 30-60 seconds per car, the 100th car could see a waiting time of over an hour for entry. It's also not possible apriori to know the length of this waiting time until a customer arrives at the location and observes the long lines.

Staff at these locations, at the hourly wage of $15-20 and whose only function is to collect the entry fee, can account for 10 percent or more of the venue operating cost. It is therefore desirable to have an entry system which minimizes or eliminates congestion and the need for manual labor at point of entry.

Commercial license plate reading systems (LPC) are available which read car license plates at points of entry. Experience and the technical literature show that these systems operate at about 75 to 85 percent recognition rate leaving up to a quarter of entering vehicles unread and unidentified. See for example a report by D J Roberts and M Casanova titled "Automated License Plate Recognition Systems: Policy and Operational Guidance for Law Enforcement" published in September 2012 and available as document #239604 from the National Criminal Justice Reference Service. Recent improvements in LPC technology have increased the recognition rate to about 95 percent by incorporating machine learning boards into these systems. An article by Tom Simonette on Jan. 27, 2020 in WIRED magazine reports that "police in Sands Point, New York, a gated village on the north shore of long Island, that police chief Thomas Ruehle says new Rekor software on his departments LPC system correctly reads plates at about 97 percent of the time compared to old technology which operated at around 80 percent." These improved systems still leave about 3 to 5 percent of incoming cars unidentified. Sands Point is a gated community with limited access routes and therefore is an unusually controlled and favorable environment for LPC system operation. Most experiences with these smartboards coupled systems show recognition efficiencies in the low to mid-ninety percent range and are therefore not reliable as stand-alone cashiering systems. Substantial performance improvements are required for these, otherwise attractive, systems to become useful and reliable in these applications.

LPC reading problems come from a wide variety of factors such as lighting, sun position, contrast issues, dirty, defective or partially obscured plates, changing weather conditions and other issues. Therefore, many issues will need to be addressed in order to further improve reading rates meaningfully. It is likely that further progress will be incremental and modest. These reading errors can further add to the waiting time at the entry point and may need operator intervention to correct misreading problems.

SUMMARY

At least one embodiment comprises a system for admitting automobiles to a venue comprising: at least one camera for recognizing an automobile, and at least one camera for recognizing a license plate. There can be also at least one server for receiving a picture of the automobile and a picture of the license plate of the automobile. Furthermore, there is at least one database for storing matching and identifying the picture of the automobile and the license plate. In addition, there is at least one screen for allowing a user to identify their automobile taken from a list of automobiles and to make payment for that automobile.

In one embodiment, the camera for recognizing the automobile and the camera for recognizing the license plate are the same camera.

There is also a process for tracking an automobile in an area. The process can comprise the steps of identifying a predefined area, and next identifying an automobile for screening into the area. Next the process involves photographing the automobile including the body and the color of the automobile. Next, the process involves photographing a license plate on the automobile. Next, the process involves storing the picture of the automobile in a database. Next the process involves storing the picture of the license plate in a database. Next the process involves creating an automobile identity in the database based upon the picture of the license plate and the picture of the automobile. Furthermore, the process involves storing the identity of the automobile in the database. Next the process involves generating an invoice for the automobile and attaching the invoice to the identity of the automobile in the database. Next the process involves selecting a list of automobiles associated with outstanding invoices. Next the process involves presenting a list of identified automobiles having outstanding invoices to the user. Next the process involves having a user select an automobile from a list of automobiles in the database comprising automobiles that have not paid an entry fee.

Thus, there is a powerful, elegant and easy to implement solution to this problem of unidentified vehicles inside the venue. This is achieved by coupling LPC plus machine learning boards with a purpose designed software app, the venue app, which eliminate the troublesome and critical failures of the state-of-the-art LPC-based system alone. In our system, a customer drives through the entrance, without a gate or attendant, at posted speed while LPC reads his vehicle license plate and takes a number of front and rear-view photos of the vehicle.

The patron is not stopped even if the LPC does not register a perfect read, as an image of this entry will be stored. The venue payment system, the payment app, enters each vehicle's information into the UNPAID category list on the venue payment app. The customer parks his vehicle and opens the payment venue app on the venue local network with his portable electronic device and enters his vehicle license plate and makes payment. The customer may also use a public or private network to access the payment app or use one of the payment kiosks situated in the parking area. The Customer may also seek out a Ranger and make payment via the Ranger's mobile app. When the customer completes payment, the payment app moves the customer's data to the PAID category list.

Failure to fully read the license plate information of any entering vehicle results in placing the photos and partial license plate data, in serial format, of such vehicle in the INCOMPLETE category list by the venue payment app. This information will include the serial location of the partial license plate data and thus produce data to narrow the possible identity of each partial read.

If a patron attempts payment and his license plate information has not been fully captured by the LPC, the customer enters his license plate information into the venue payment app and the app displays an array of photos of vehicles from the INCOMPLETE category list which most closely matches the information entered by the customer. The customer can then easily identify his own car to the payment app from this 'line-up' and complete making his payment. The payment app then moves his information into the "Paid" category. By this method, essentially all cars which enter this new type of automated entry will make the required payment without the need for an entry gate or toll booth attendants. Using a machine learning board to find best approximate matches between the information entered by customer and the data found in the INCOMPLETE category list allows for a greatly reduced number of possible matches needed on the "line-up" list and makes it very easy for customer to identify his own vehicle on the INCOMPLETE list, even in a very large venue.

Assuming a five percent failure rate by LPC to capture license plate information and a venue with a parking capacity of one hundred cars, the payment app would, at worst, only have to show photos of five vehicles to the customer for identification. The array shows high resolution photos in color with views of the vehicle both from front and back. Identification by the owner of his vehicle from such a photo array would be quick, easy and absolute. Our system presents near matches of the most likely car to the patron at time of payment. This feature enhances the overall identification efficiency of our system to essentially 100 percent and makes it possible to operate such venues without gates and gate workers. The presentation of these pictures would be sent via an instruction of a server having a microprocessor, accessing a database of saved or archived unpaid vehicles, and then sending this list of vehicles to the user's remote device or kiosk. The array of unpaid vehicles is sorted based upon time, location, date and unpaid status.

Indeed, even in a much larger venue with a parking capacity of a thousand cars, at worst, the photo array would consist of only fifty cars in a five by ten array under the worst possible circumstance. However, failure to identify license plates by LPC is typically a partial failure which results in capturing most of the plate data including sequence and location of identified and missing digits. Therefore, the machine learning board will use the partial identification to match out all license plates which do not fit the partial match. Thus, reading only two digits and their location from a six-digit plate will reduce the "line-up" to but a very few likely prospects, especially if the data includes color photos of the customers car. This system therefore is capable of handling very large venues efficiently.

These venues have Rangers patrolling the parking lots, campgrounds and beaches on motorized vehicles to keep general order and aid the customers in various ways. In the present invention, Rangers will carry a mobile device which has access to all the venue app features and can scan license plates. In this way, a Ranger can scan license plates inside the venue and determine the payment status of each parked vehicle. The ranger can also accept payment from customers through the ranger payment app if the customer so desires. Based on venue rules, the ranger can issue violations to any vehicle which has failed to make payment within the venue-specified time period. Violations are sent to the registered owner of the vehicle by a violation payment service.

The system also uses LPC at points of exit and records vehicles leaving the venue. Collecting this information has several important benefits to the operation of the venue. Keeping a constant tally of incoming and departing vehicles allows the system to determine the current and accurate level of occupancy of the venue. The system can then advise potential visitors by email or other messaging that openings exist. In this way the system can be operated at increased occupancy and higher profitability. The second benefit is that LPC at the exit allows for a second chance at identifying cars which were not captured at entrance. Checking LPC data at exit against the "Unpaid" category list results in a violation being mailed to the owner of record to any violator. The high probability of getting a citation if payment has not been made by a departing vehicle is important in preventing revenue loss or leakage for the venue. A further significant benefit results from combining the power of the venue app with LPC at all points of exit. Venue operators are painfully aware that some unscrupulous customers gain entry by driving into the venue through the exit route and avoid both detection and making payment. Current state of the art systems have no way of dealing with this known financial loss since increasing personnel to watch against this type of violation is not financially viable.

Combining LPC camera at point(s) of exit with the venue app allows for direct detection and identification of such violators. Owners of violating vehicles will be sent notice of violation automatically. Further, a Ranger can be alerted to such an entry violation and dispatched to confront the violator when he parks his vehicle. Ranger can reach the violating vehicle by searching for license plates number on parked cars for the culprit identified by the venue app. Alternatively, a camera located high above the venue can automatically tag and track any vehicle entering through an exit and show the Ranger on his venue app exactly where the perpetrator has parked his vehicle.

As has been made clear, this new entry payment system has many benefits over the state-of-the-art payment systems. The present invention reduces labor costs for the venue by eliminating the need for entry booth attendants. The system also eliminates congestion at point(s) of entry and the long waiting lines at point of entry. The venue app's ability to keep track of current occupancy levels and its ability to inform potential customers of open venue spots can increase revenue for the venue. The obvious presence of the 'all-seeing' LPC based venue app will reduce and likely eliminate revenue loss through nonpayment.

BRIEF DESCRIPTION OF THE DRAWINGS

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

DETAILED DESCRIPTION

Figure 1:
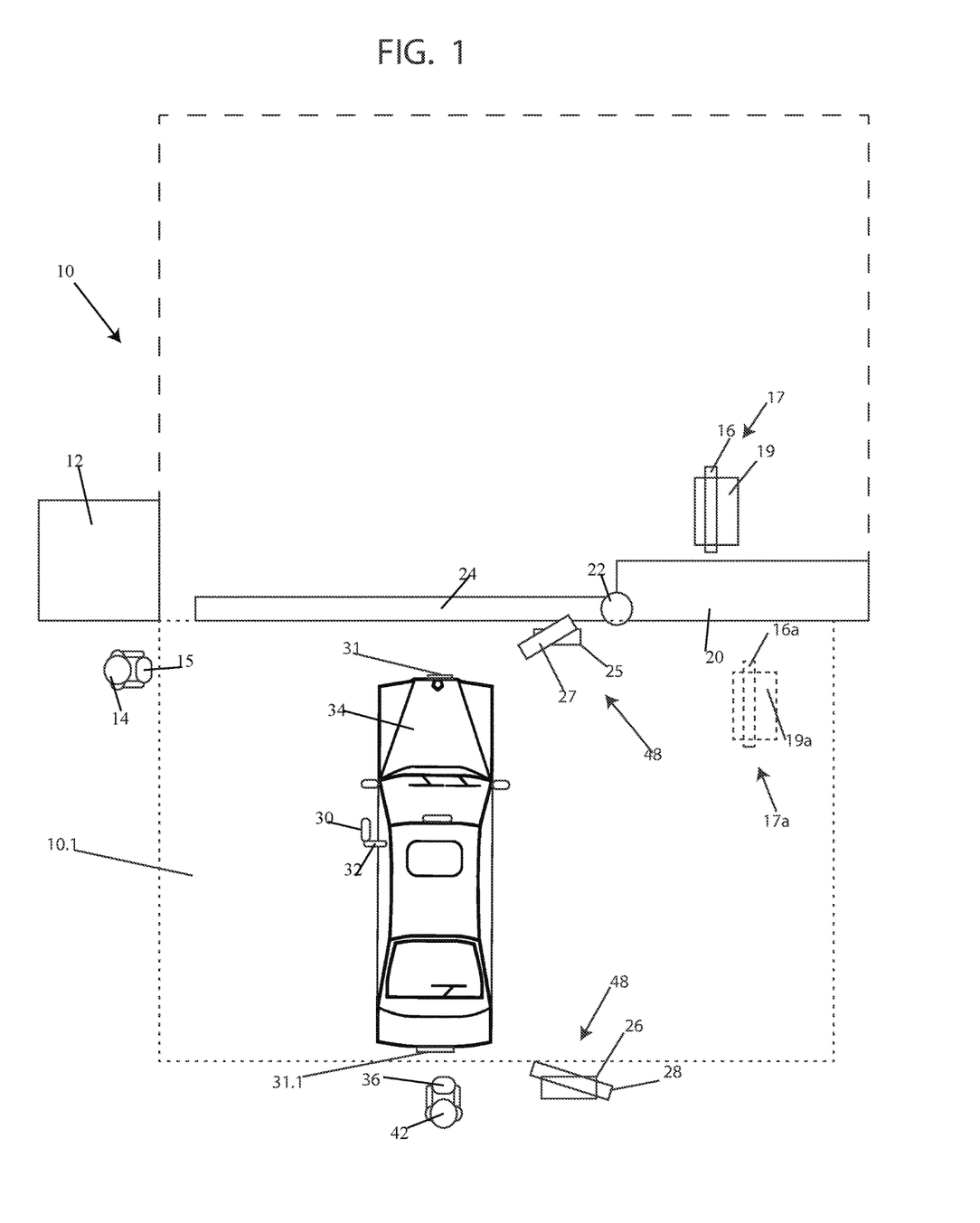
FIG. 1 is a plan view of a first encounter with the system.
Figure 3:
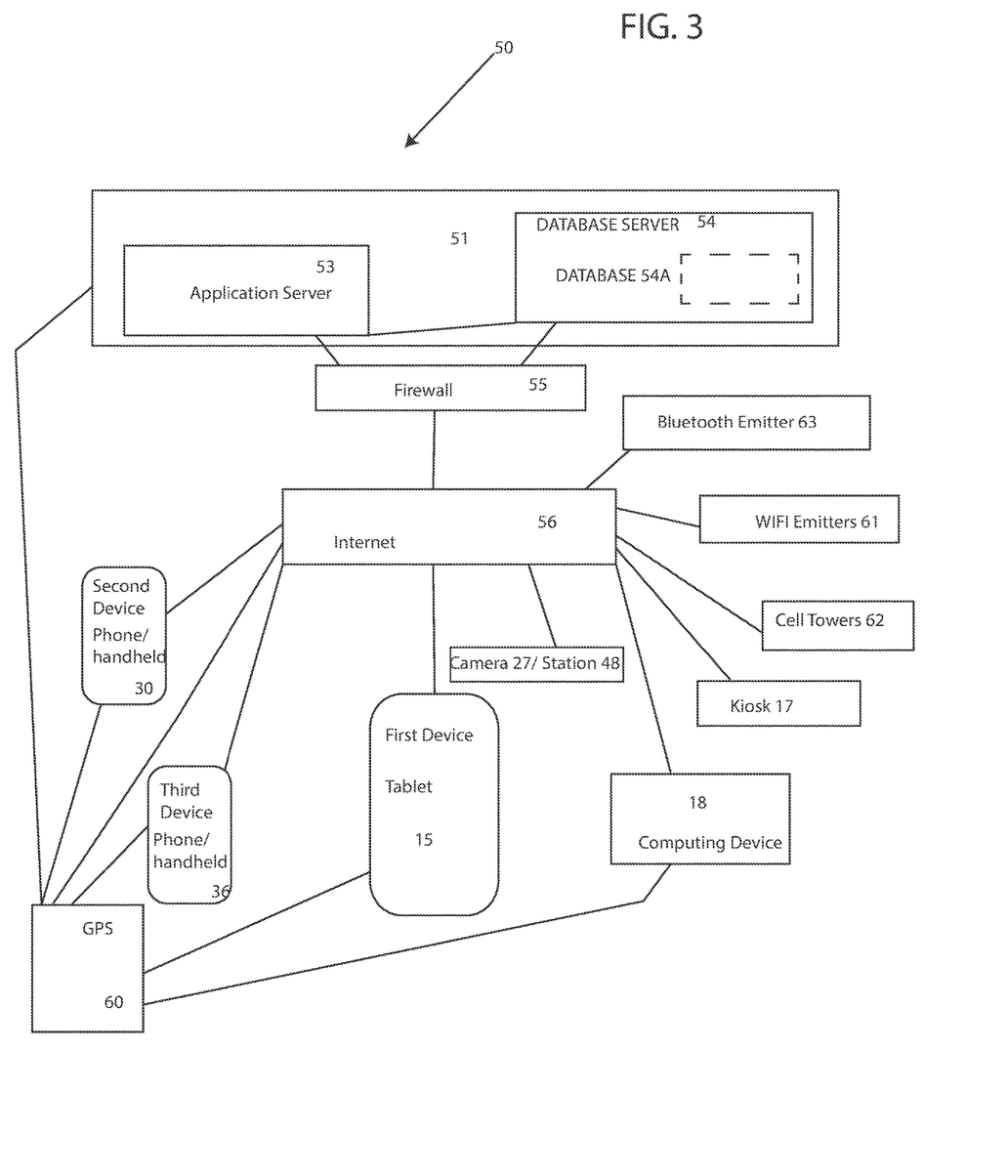
FIG. 3 is a block diagram of a layout of a network.

FIG. 1 is a plan view of a first encounter with the system which shows a predefined area 10 which can be defined by GPS coordinates stored in a database such as database 54a (See FIG. 3). In, addition there is also another pre-area 10.1 which is positioned outside of the pre-defined area, and which is configured for pre-screening of an automobile. The GPS coordinates of this area 10.1 can also be stored in the database such as database 54a in FIG. 3. There is a station 12, which is configured to potentially house an attendant, if necessary. An attendant 14 can have an electronic device 15 which can be used to check an individual into the area. Alternatively, a check-in station 48 comprising a camera 27 disposed on a camera stand 25 can be used to take a picture of a license plate 31. In addition, there is also another check-in station 48, comprising another camera 28 positioned on another camera stand 26 which is configured to take a picture of a license plate 31.1. Thus, there can be two check in stations, on positioned to take a picture of a front half or front end of an auto and another positioned to take a picture of a back half or back end of an auto. There is also shown an attendant 42 who is positioned behind the automobile with an electronic device which also allows a user to pass into the pre-defined area once the user is screened. The electronic device 36 held by the other attendant 42 can be in the form of a portable camera such as a smartphone wherein the attendant 42 can take a picture of a back license plate 31.1 if camera 28 somehow does not recognize or capture license plate 31.1.

There is also a fence 20, a lift 22 and a gate 24. The gate 24 is configured to be lifted by the lift 22 upon instructions from either a server or from an attendant after the automobile 34 has been identified through the license plate picture and/or through the picture of the automobile. Disposed inside of the automobile 34 is a passenger 32 as well as an electronic device 30 which can also be used to identify the individual and/or automobile as well. Disposed inside of the predefined area is a kiosk 17 which includes a base 19 and a screen 16. The user once inside of the pre-defined area 10 can then work with the kiosk 17 to check in the vehicle if necessary. While two attendants 14 and 42 are shown, with this automated system, it is possible to operate the entrance and entry of an automobile without attendants.

Figure 2:
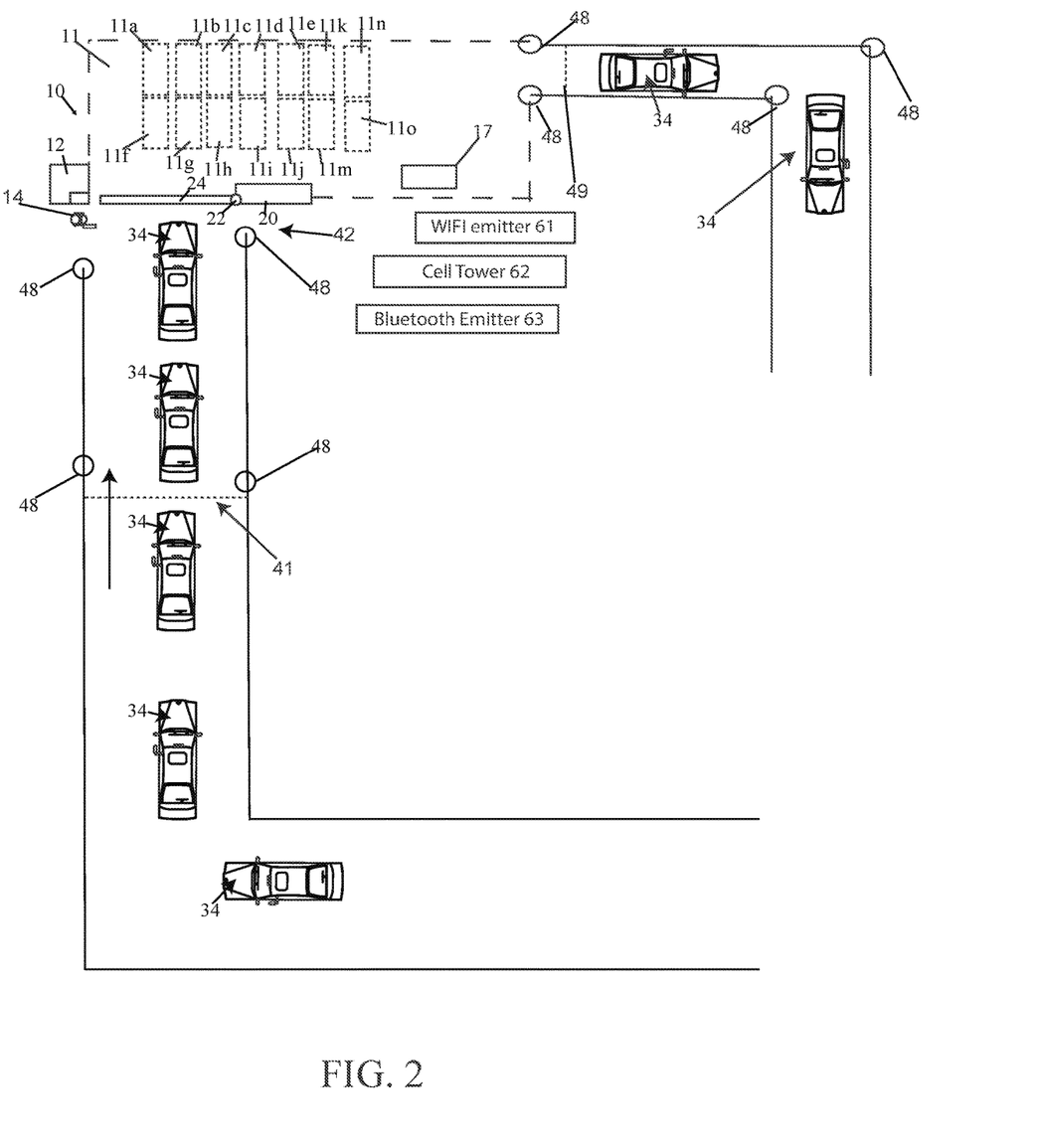
FIG. 2 is a plan view of an encounter with a second system.

FIG. 2 is a plan view of an encounter with a second system. In this view there are a plurality of stations 48 which are positioned in a line which can be used to identify particular autos such as autos 34 in a line. These stations are configured to take a picture of both a front license plate such as license plate 31 and a back-license plate such as license plate 31.1 as well as a picture of the auto itself. This can be done in an initial region such as region 41. In this view, there is shown a house or station 12, an attendant 14, a predefined area 11, which has a plurality of parking spots 11a, 11b, 11c, 11d, 11e, 11f, 11g, 11h, 11i, 11j, 11k, 11m, 11n, 11o. As shown in FIG. 1 this area can have a fence 20 a lift 22, a gate 24. A kiosk 17 can be disposed inside of the area while stations 48 for photographing both the auto and the license plate are positioned at both the entrance and at the exit 49 of the area. Wireless emitters such as a WIFI emitter 61, a cell tower 62 and/or a Bluetooth emitter 63 can be positioned adjacent to these areas to allow for full wireless communication by the operators of the autos or motor vehicles and any attendants or rangers in the area.

FIG. 3 is a block diagram of a layout of a network which can be used to accomplish this system. For example, there is a computing device 18 which can be housed inside of station 12. This computing device can be connected to a network either in a wired or wireless manner. This computing device 18 is coupled to or in communication with the camera 27 which is part of the station 48. In addition, computer or computing device 18 is in communication with kiosk 17 comprising base 19 and screen 16. In addition, there are users' handheld devices 30 and 36 as well as an attendant tablet 15 which are also in communication with the network. The network can also include the internet 56 which is also in communication with a Bluetooth emitter 63, Wi-Fi emitters 61, cell towers 62 as well. The Wi-Fi emitter 61, the cell tower 62, and/or the Bluetooth emitter 63 are configured to allow for wireless communication between the components such as the wireless devices such as the phones or handhelds 30, and 36 as well as the first device such as a tablet 15. Once the remote components such as the mobile devices 15, 30 and 36 the camera 27 and the kiosk 17 communicate through the internet, this information can be passed through a firewall 55 onto a server network 51 which can include an application server 53, and a database server 54, having a database 54a. The database is configured to store the information about the site, about each automobile and about each consumer.

While this server system and layout is simply an example, this system can be used as a closed end system so that has a LAN 33 which interfaces with the kiosk, the camera 27 or station 48 the WIFI emitters 61, the Bluetooth emitters 63 the computing device 18 such that the computing device 18 can run a local application of the program and process without the need for interaction through a network connection such as through the internet 56 onto a firewall 55 or on to the servers 51 including application server 53, and or database server 54.

Figure 4A:
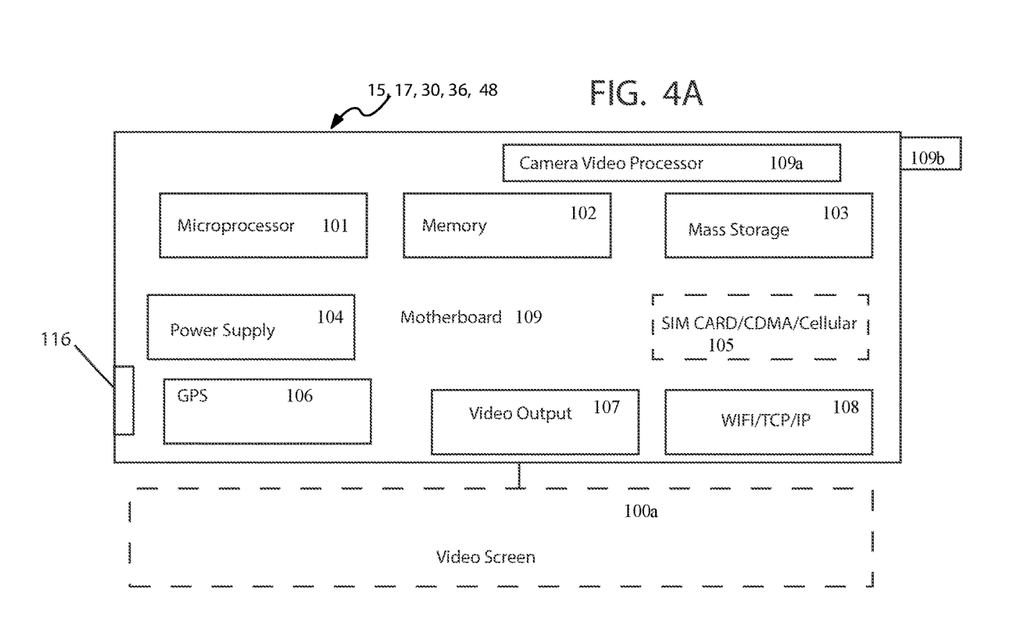
FIG. 4A is a block diagram of a portable computing component.

FIG. 4A is a block diagram of a portable computing component which discloses the standard components associated with any one of the associated components of electronic devices 15, 17, 30, 36 and 48. For example, this design can include a first phone or pad 15, a second phone or pad 30, a third phone or pad 36, as well as kiosk 17 and a camera 27 of camera station 48. However, with this design, camera 27 of camera station 48 can also be driven by an optional motor 116 which controls the angle and orientation of this camera. Thus, with this design there is a motherboard 109, a microprocessor 101, a memory 102, a mass storage device such as a hard drive or EEProm, a power supply 104 such as a battery or hard-wired AC power, an optional SIM card or cellular card 105 which allows for communication with cell towers 62. There is also a GPS 106 which allows for communication with GPS satellites 60. In addition, there is a video output 107 as well as a WIFI/TCP/IP transmitter 108. Furthermore, depending on the device there is an optional video screen 100a as well.

Figure 4B:
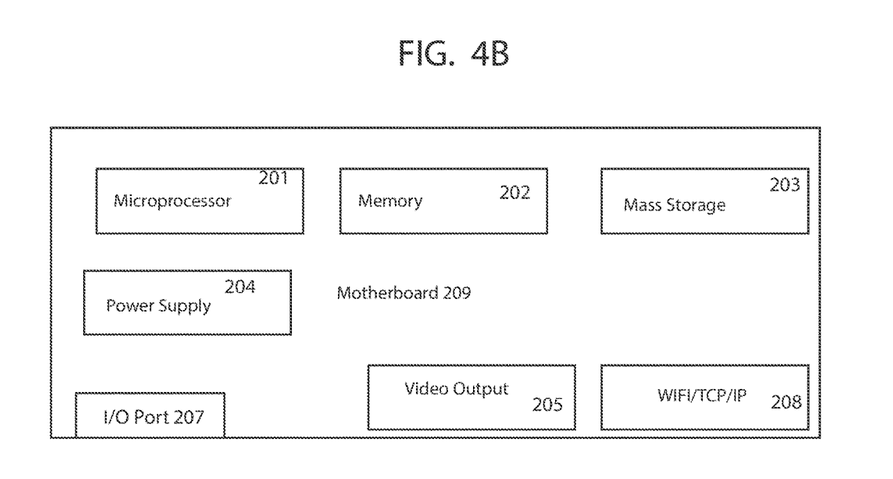
FIG. 4B is a block diagram of a server.

FIG. 4B is a block diagram of a server or computing device such as server application server 53, database server 54 or computing device 18 which can be associated with the station 12. With this design, there is a motherboard 209, which houses a microprocessor 201, a memory 202, a mass storage 203, a power supply 204 for powering the components, a video output 205. (optional). There can also be an I/O port (input/output port) and a communications port comprising a TCP/IP/WIFI port 208 allowing the device to communicate with the network.

Figure 5:
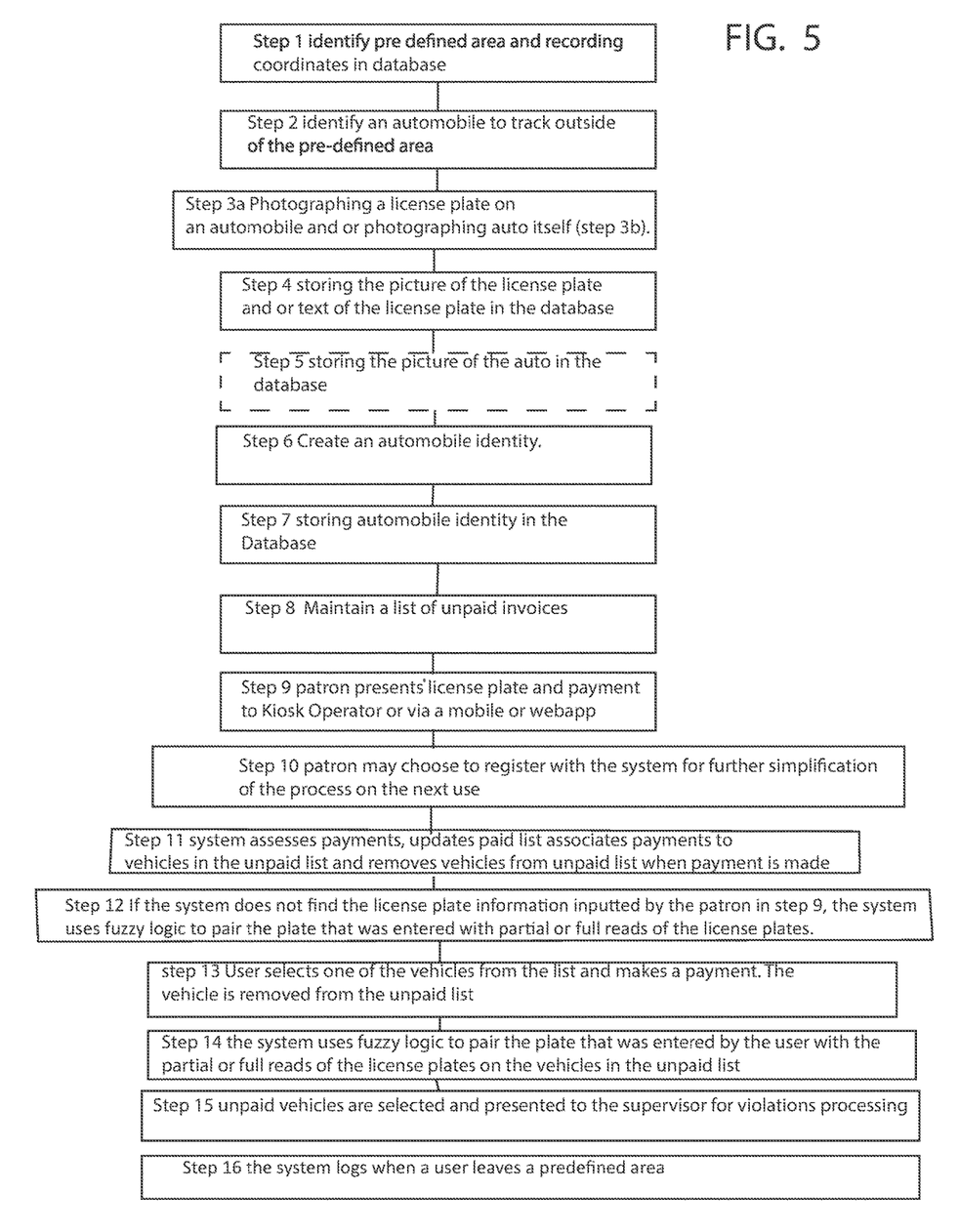
FIG. 5 is a flow chart for the process.

FIG. 5 is a flow chart for the process for tracking an automobile in an area. The process is mostly if not entirely performed using microprocessor 201 in coordination with memory 202, and mass storage 203 to add or modify information in database 54a in database server 54, as it is controlled by application server 53. The process can comprise the steps of step 1 identifying a predefined area. The identification of the pre-defined area can include a remote device such as a tablet 15, or a portable phone 30 or 36 having a GPS transmitter. Devices can be used to create a boundary for the area using GPS coordinates that can be stored in the database such as database server 54. In addition, each of the stations such as station 48 or the kiosk can also be located on a GPS based plot map of the pre-defined area. In that way each station both at the entrance and the exit can be identified based upon either its location or based upon a MAC address or other network identifying feature. Next, in step 2 an attendant or the system can identify an automobile for screening into the area. Next in step 3a the process involves photographing a license plate (This occurs using a camera 27 of the station 48. The camera can be moved such as through motor 116 to obtain the proper picture of the license plate and the body of the automobile (Step 3b). The body is identified via the camera by recognizing the shape and relative size of the body. Next, in step 4 the process involves storing the picture of the license plate and or read text of the license plate in a database. In this case, the picture of the license plate is read and transcribed into digits or typographic indicia based upon the analysis of the shape and arrangement of the pixels on the picture of the license plate which is then stored in the database.

Thus, the picture from station 48 is transmitted through an associated transceiver 108 through the internet 56 through firewall 55 into application server 53 and then stored in database 54a of database server 54. Alternatively, station 48 transcribes the picture of the license plate into a series of digits (numbers and/or letters) or other indicia which is then transmitted and then stored in the database. Alternatively, the station 48 can read the indicia on the license plate picture, transcribe the information on the license plate and then forward the transcribed information to the server. For example, if the picture revealed that the plate was a New York State Plate based upon coloring, and logos, it would then read the indicia on the plate such as ABC-1234, which might be a standard plate set of indica conforming to a series of letters followed by a series of numbers. The plate may also have indicia or lettering indicating the state that the plate originates from or a logo such as the statue of liberty or other type of logo to indicate the state in which the plate is from. The reader can also read the coloring of the plate as well.

Next in step 5, the process involves storing the picture of the auto in a database such as database 54a. While all of the steps are optional this step is optional and not in the preferred embodiment. Next, in step 6, the process involves creating an automobile identity in the database based upon the picture of the license plate and the picture of the automobile. The creation of the identity can involve using microprocessor 201 running a program in memory 202 fed from mass storage 203 to assemble the photographs of the license plate, the indicia of the license plate (digits etc.), the automobile and any known profiles of the auto into the database. Alternatively, it could simply be the data extracted from a picture of the license plate or of data entry of the license plate itself if necessary. If the license plate of an automobile is identified as a past user, then this picture or data is matched with a previous profile that is already stored in the system. If the license plate is new, then the user can fill out this profile and pay for the entrance in a later step via the kiosk 17. In addition to setting up an identity of the automobile based upon the license plate information, the process can also include the setting up or registering of a user (See FIG. 9 for an example of the process for registering a user).

Thus, once the profile is created or at least initially set up, in step 7 the process involves storing the identity of the automobile in the database.

Next, in step 8 the system would maintain a list of unpaid invoices for presentation and accounting for future payments. This list of unpaid invoices would be stored in the database and then presented as available for review on the kiosk.

Next, in step 9 the patron presents their license plate and payment to the kiosk operator or to the kiosk alone, or on their mobile device such as via a webapp. This presentation of the license plate then matches the user or patron with the list of unpaid invoices so that the user can then pay their invoice.

As the patron is inputting their license plate for future payment, the patron can, in step 10 the patron may choose to register with the system for further simplification of the process at next use. For example, this process is shown in greater detail in FIG. 9.

Next, in step 11 the system assesses payments, updates the list of associates payments to vehicles in the unpaid list and removes vehicles from the unpaid list when a payment is made. Thus, with each punch in of information, the field of available autos can be narrowed in the database until only the remaining matching auto with the matching license plate is available. If the numbers do not exactly match, then the process proceeds to step 12.

Next, in step 12, if the system does not find the license plate information input by the patron, the system uses fuzzy logic (artificial intelligence) to pair the plate that was entered with partial or full reads of the license plates. This fuzzy logic includes matching a partial list of indicia or digits stored in the database regarding the outstanding invoices with the list of digits or indicia input by the user. With each input by the patron, the list of available license plates from the list of unpaid invoices is narrowed down until the only remaining plates are left for payment.

Next, in step 13 the user or patron selects one of the vehicles from the list and makes a payment. The vehicle is then removed from the list. Next, as indicated above, with payment, the system matches the payment with the plate listed or uses fuzzy logic to pair the plate that was paid with the list of plates in the unpaid list. Next, in step 15 unpaid vehicles are selected and presented to the supervisor for violations processing.

Next in step 16, the system such as through microprocessor 201 can log when a user leaves the pre-defined area. This allows for the system to open up new spots for autos to enter into the predefined area. The confirmation that the user leaves the area can take place when a camera from an associated station such as station 48 at an exit takes a picture of the leaving patron's license plate and then this license plate is matched with one of the license plates of the recent entrants into the predefined area.

Figure 6:
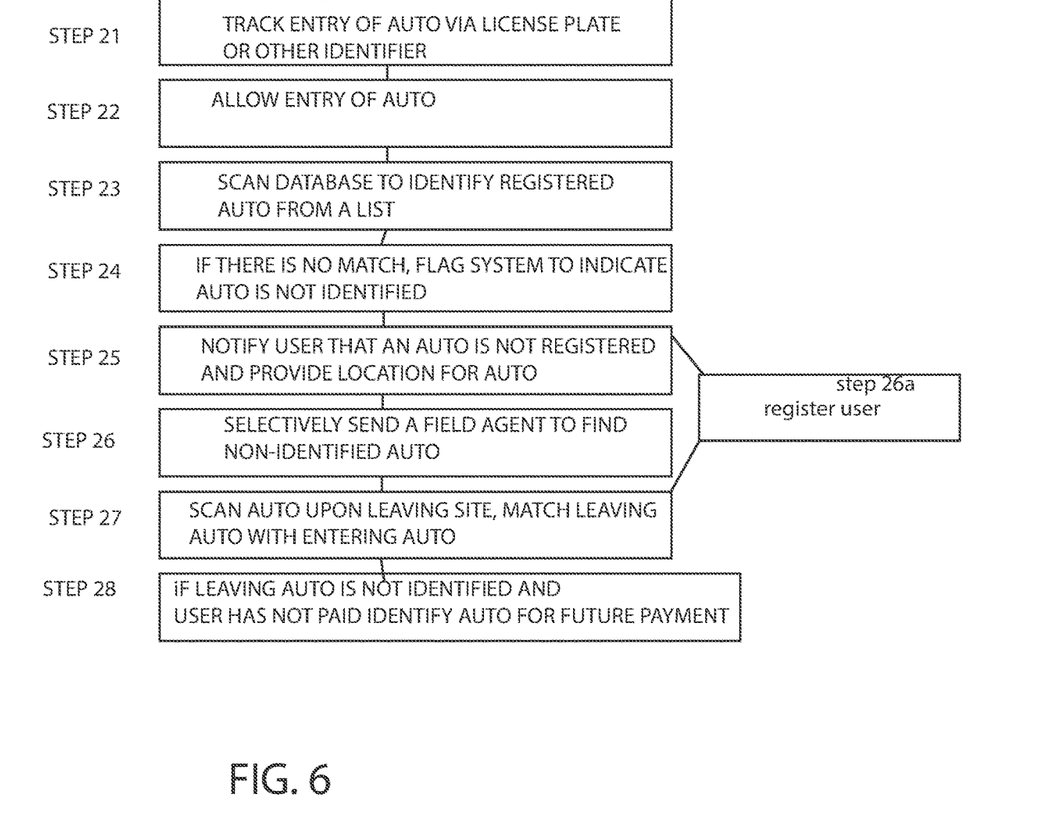
FIG. 6 is a flow chart for the process for tracking the entry and exit of autos from a site.

FIG. 6 is a flow chart for the process for tracking the entry and exit of autos from a site. For example, the process starts with step 21 wherein the system tracks the entry of an auto via a license plate or other identifier. In this step the system conducts an optical character recognition scan for the characters in the license plate. Each of the individual characters is recognized and indexed to match based upon shape with characters and shape kept on file. This step is performed by the microprocessor such as microprocessor 101 or 201 recognizing each individual shape of characters in a license plate. Next, upon recognition of the license plate and the auto, the auto is allowed into an area. In this step, even if the auto is not fully recognized it can still be allowed into an area. Next, in step 23, a database is scanned to determine whether the auto is registered. This database can be taken from any suitable database such as from a first DMV server 130, or an alternative DMV server 131 (See FIG. 7). Alternatively, a central server 125 can pull this information from commercial databases such as commercial database 132 or commercial database 133. Central server 125 then feeds this information into server networks 51*a* or 51*b* which are similar to the server network 51 shown in FIG. 3. In step 24 the system determines that if there is no match the system flags the entry to determine and indicate that the auto is not identified. Next, in step 25 the system such as central server 125 notifies the system controller (administrator) that the auto is not registered and then the system provides for a location of the auto based upon the scanning or check in station 48. Each check in station has an identity and an address so that both the central server 125 as well as the server network shown in FIG. 3 would have a record of the location of this check in station 48. The address can be stored as GPS coordinates or as an actual address in a database such as database 54A. Next, in step 26, the system can then send out a message and notify a field agent to find a non-identified auto.

Either before or after step 26, step 26*a* can occur wherein a user can be registered. For a more complete description of registering a user see FIG. 9 for the process for registering a user.

Next in step 27 the system can scan the auto upon leaving the site, match the leaving auto with the entering auto and then determine whether this was one of the missing non-identified autos.

Figure 7:
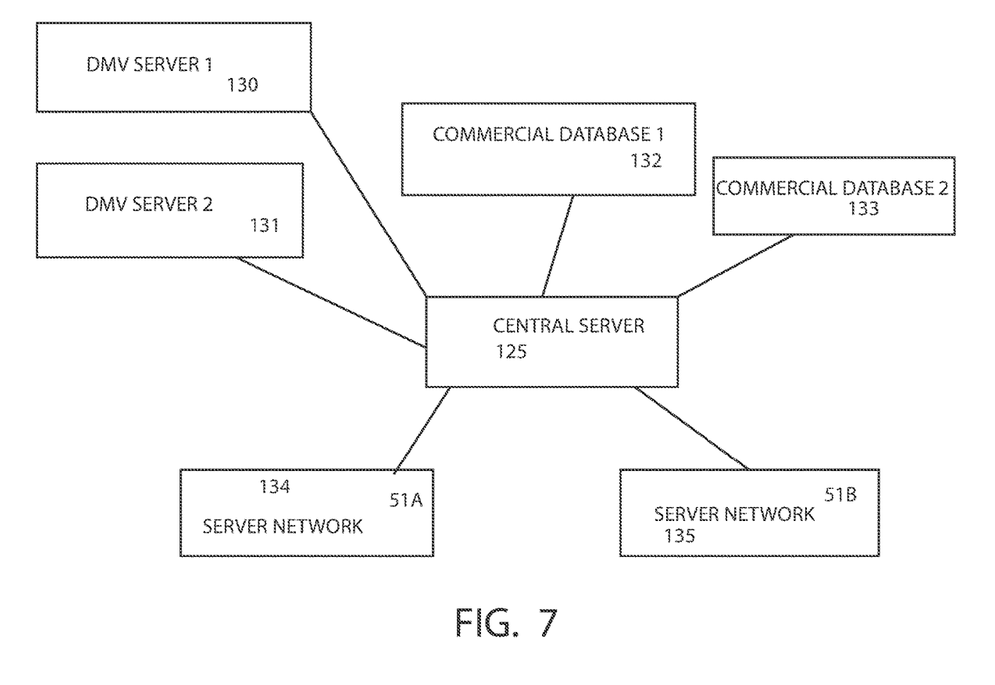
FIG. 7 is a block diagram of a server layout for connecting to municipal databases.

FIG. 7 is a schematic block diagram for a distributed network of servers in a system. For example, there is a central server 125 which is coupled to server networks 134 and 135 which are representative of servers 51*a* and 51*b* (see server network 51 in FIG. 3. Central server 125 is also in communication with different commercial databases 132 and 133 which may have information from commercially available sites to track patrons or users to make sure that unpaid bills are processed and paid as well as unidentified users/patrons are tracked down for a later processing of payment. In addition, the central server 125 is also in communication with DMV server 130 and or DMV server 131. Thus, central server 125 can then communicate with these DMV servers as well to obtain the identity of the license plate holders so that the central server 125 can be used to then identify and invoice personally the owners of the vehicle based upon either commercial information stored in a commercial database 132 and 133 or from DMV servers 130 and 131.

Figure 8:
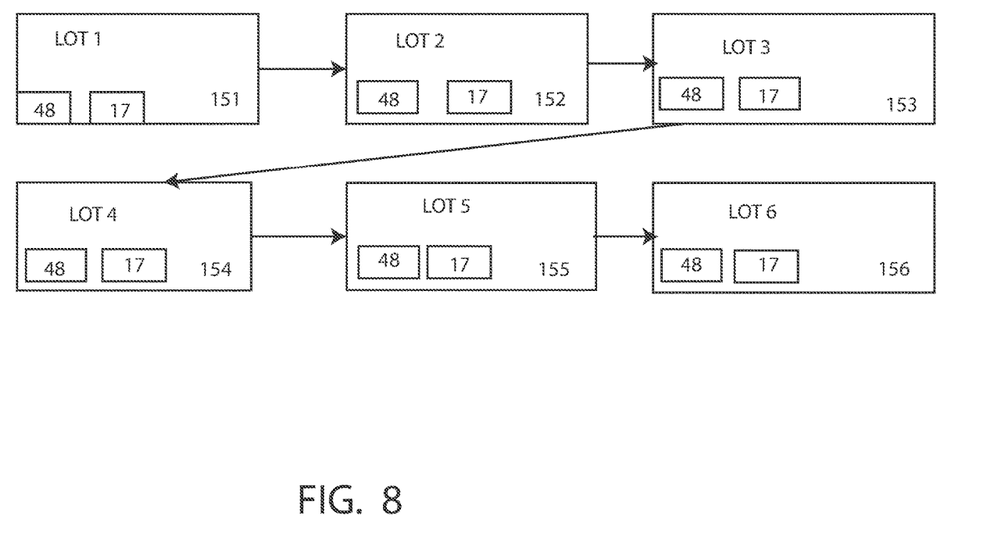
FIG. 8 is a schematic block diagram for a series of parking lots.

FIG. 8 is a schematic block diagram for a series of parking lots. With the entry and exit system comprising at least the camera station 17 as well as the check in station 48 each of the lots 151, 152, 153, 154, 155, and 156 can then track each of the cars. When the first lot 151 fills up, the system would know this from tracking the autos in an entry and exit manner. Then the system could notify an attendant that the cars/autos should be directed towards the next lot. When the second lot fills up the next set of cars/autos are sent onto the next lot and so on. In this way the lots can be filled sequentially and the system such as central server 125 can track the occupancy of the vehicles as well.

Figure 9:
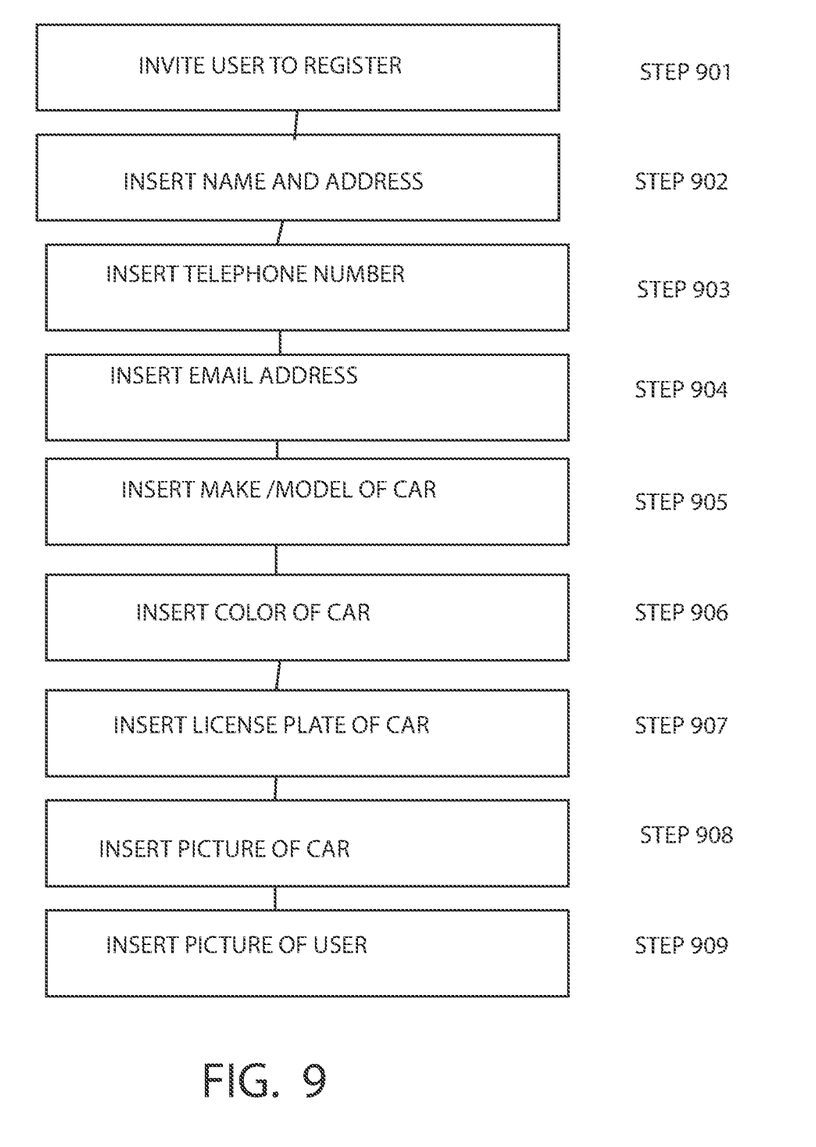
FIG. 9 is a flow chart for registration.

One way to track the autos/users is to have an extensive registration system for each of the autos/users. The user can either pre-register or register on site through check in station 48. For example, FIG. 9 is a flow chart for registration of a user/auto, wherein in this embodiment, the user is invited to register in step 901. This registration includes inserting the name and address in step 902. Next, the user can insert his/her telephone number in step 903. Next, in step 904 the user can insert his/her email address in step 904. Next in step 905 the user can insert his/her make and model of the car. Next, in step 906 the user can insert his or her color of the car. Next, in step 907 the user can insert his/her license plate of the car. Next, in step 908 the user can insert a picture of the car. Next in step 909 the user can insert a picture of the user as well for the user's profile. With this composite profile of the user, if a license plate is not properly read, or identified upon entry or exit, the system can match a partial reading of the license plate with the existing database of registered users. For example, if the auto had a series of identifying dents or marks, the recent entry photograph can be matched with the photograph on file of the registration. Furthermore, the color, and/or the make/model of the auto, can then be matched with the information on file so that if there is only a partial reading of the information, this partial reading can be matched with the other identifying characteristics and then be used to identify the auto.

Figure 10:
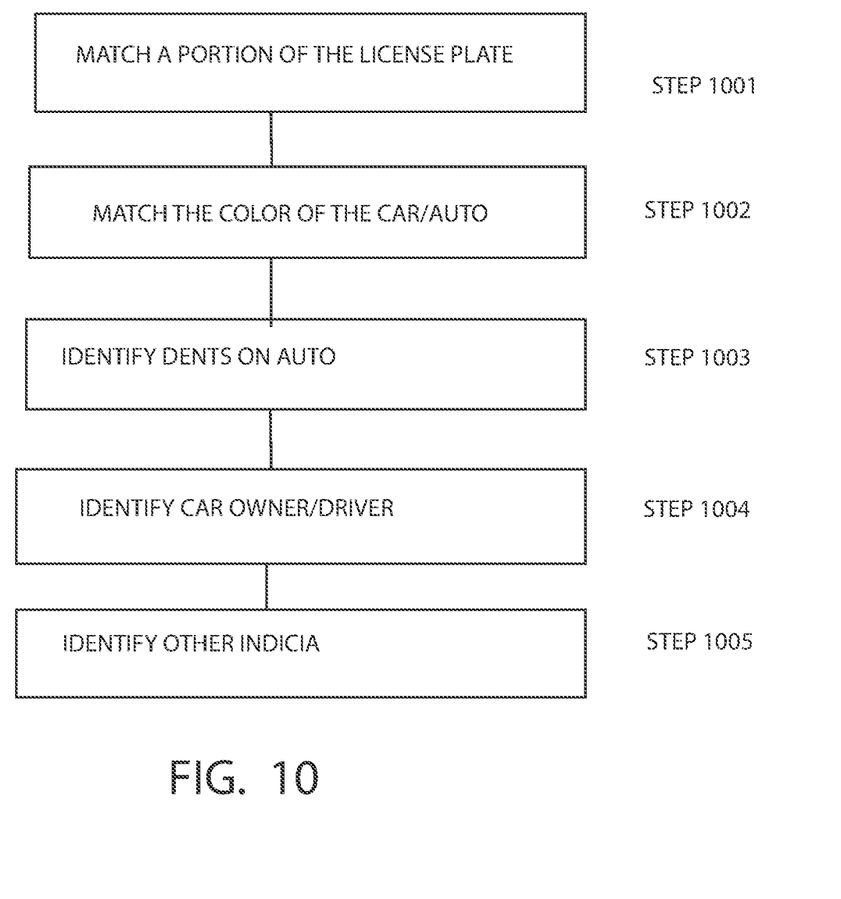
FIG. 10 is a flow chart for tracking delinquent autos.

FIG. 10 is a flow chart for tracking delinquent autos, which shows that in step 1001 a portion of the license plate can be matched with the database to generate a partial match. Next, in step 1002, the system can match the color of the auto with the database and match the color with the partial list of the license plate. Next, in step 1003 the system identifies dents on the auto via pictures of the auto. This step can be based upon identifying the unique shapes in the body wherein the dents are determined to deviate in shape from a surface on the body.

Next in step 1004 the system can identify the car owner or driver via facial recognition. Next in step 1005 the system can identify other indicia or characteristics such as the make/model of the auto. These identifying features are matched only with license plates that have at least partial readings of the same indicia such as the same letters and numbers in sequence. Thus, the system narrows the query for color, make/model or dents to only those autos that are in the pre-selected list of qualifying partial license plate matches.

In at least one embodiment, the step of presenting a list of identified automobiles associated with outstanding invoices (step 10) comprises presenting the list on a kiosk inside of the pre-defined area.

In at least one embodiment, the step of tracking when an automobile leaves the pre-defined area (step 12) comprises taking a picture of the automobile body and taking a picture of the automobile license plate and matching these pictures with pictures stored in the database.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Although specific advantages have been enumerated above, various embodiments may include some, none, or all of the enumerated advantages.

What is claimed is:

1. A process for tracking an automobile in an area comprising the steps of:
   identifying a predefined area;
   identifying an automobile for screening into the area;
   photographing the automobile to obtain a picture of the automobile including a body and a color of the automobile;
   photographing a license plate on the automobile to obtain a picture of the license plate;
   storing the picture of the automobile in a database;
   storing the picture of the license plate in the database;
   creating an automobile identity in the database based upon the picture of the license plate and the picture of the automobile;
   storing the identity of the automobile in the database;
   generating an invoice for the automobile and attaching the invoice to the identity of the automobile in the database;
   selecting a list of automobiles associated with outstanding invoices;
   receiving license plate information from a user;
   retrieving a profile of the user based on at least a partial match of the received license plate information;
   retrieving an image of a user automobile associated with the user from the profile;
   retrieving an image of an owner of the user automobile from the profile;
   taking a picture of the user and determining that the user matches the owner using facial recognition;
   identifying, from among automobiles on the list of automobiles associated with outstanding invoices, candidate automobiles having license plate information that partially matches the received license plate information;
   matching identifying features of the candidate automobiles with identifying features of the user automobile based on the image of the user automobile;
   presenting a list of identified automobiles having the matched identifying features to the user, wherein the matched identifying features comprise a make and model of the user automobile, a color of the user automobile, and dents on the user automobile; and
   having the user select an automobile from the list of the identified automobiles for payment of an entry fee.

2. The process as in claim 1, wherein said step of identifying a pre-defined area comprises outlining GPS coordinates for said area and storing said GPS coordinates in the database.

3. The process as in claim 1, wherein said step of presenting a list of identified automobiles associated with outstanding invoices comprises presenting the list on a kiosk inside of the predefined area.

4. The process as in claim 3, further comprising the step of tracking when the automobile leaves the predefined area.

5. The process as in claim 4, wherein said step of tracking when the automobile leaves the pre-defined area comprises the picture of the automobile and the picture of the license plate with pictures stored in the database.

6. The process as in claim 4, further comprising the steps of: contacting an external database for the license plate information; and identifying an owner of the automobile based upon the license plate information; contacting the owner to notify the owner that the automobile has left a site without paying for a service; and forwarding an invoice to the automobile owner so that the owner pays the invoice.

7. The process as in claim 6, wherein the step of forwarding an invoice to the automobile owner comprises sending the invoice via electronic transmission.

8. The process as in claim 7, wherein the step of forwarding an invoice to the automobile owner comprises sending the invoice via email.

9. The process as in claim 7, wherein the step of forwarding an invoice to the automobile owner comprises sending the invoice via text messaging.

10. The process as in claim 6, wherein the step of identifying an owner of the automobile based upon the license plate information comprises scanning an image of the license plate, and then determining the characters on the license plate via text recognition software and then comparing the characters on the license plate to a set of characters stored in an external database.

11. The process as in claim 1, wherein said step of matching identifying features comprises matching a make and model of an auto with at least a partial reading of a license plate.

12. The process as in claim 11, wherein the step of matching identifying features comprises matching dents on an auto with stored pictures of the auto.

13. The process as in claim 12, further comprising the step of tracking the location of the automobile.

14. The process as in claim 13, further comprising the step of determining the location of the auto via determining a location of a scanning check in station which checked in the automobile.

15. The process as in claim 13, further comprising the step of selectively sending a field agent to find the location of the automobile.

16. The process as in claim 1, further comprising the step of determining how many automobiles are in a lot by determining how many automobiles have entered and left the lot.

17. The process as in claim 16, further comprising the step of directing additional automobiles to an adjacent lot when a first lot is filled up.

* * * * *